US009981835B2

(12) United States Patent
Kim

(10) Patent No.: US 9,981,835 B2
(45) Date of Patent: May 29, 2018

(54) FORKLIFT AND FORKLIFT CONTROL METHOD

(71) Applicant: DOOSAN CORPORATION, Seoul (KR)

(72) Inventor: Dae Hyun Kim, Seoul (KR)

(73) Assignee: DOOSAN CORPORATION, Seoul (KR)

( * ) Notice: Subject to any disclaimer, the term of this patent is extended or adjusted under 35 U.S.C. 154(b) by 12 days.

(21) Appl. No.: 15/101,117

(22) PCT Filed: Oct. 16, 2014

(86) PCT No.: PCT/KR2014/009700

§ 371 (c)(1), (2) Date: Jun. 2, 2016

(87) PCT Pub. No.: WO2015/083935

PCT Pub. Date: Jun. 11, 2015

(65) Prior Publication Data

US 2016/0376135 A1 Dec. 29, 2016

(30) Foreign Application Priority Data

Dec. 3, 2013 (KR) ........................ 10-2013-0149204

(51) Int. Cl.
*G06F 7/70* (2006.01)
*B66F 9/20* (2006.01)
(Continued)

(52) U.S. Cl.
CPC .............. *B66F 9/20* (2013.01); *B66F 9/0755* (2013.01); *B66F 17/003* (2013.01)

(58) Field of Classification Search
USPC ............................................................ 701/50
See application file for complete search history.

(56) References Cited

U.S. PATENT DOCUMENTS 4,511,974 A * 4/1985 Nakane ................. B66F 17/003 340/685
6,073,069 A * 6/2000 Kim ....................... B23Q 15/22 172/2

(Continued)

FOREIGN PATENT DOCUMENTS

JP H0761792 A 3/1995
KR 10-1997-0006523 A 4/1997

(Continued)

OTHER PUBLICATIONS

International Search Report mailed in corresponding International Patent Application No. PCT/KR2014/009700 dated Jan. 20, 2015, consisting of 5 pp. (English Translation Provided).

(Continued)

*Primary Examiner* — Tyler Paige
(74) *Attorney, Agent, or Firm* — Volpe and Koenig, P.C.

(57) ABSTRACT

The present disclosure relates to a forklift and a forklift control method. The forklift and the forklift control method according to the present disclosure may adjust a fork/mast inclination with reference to the coefficient of friction, and precedently and appropriately adjust a fork/mast inclination right before the forklift enters or exits from a slope by referring to geological information. Further, when a degree of danger is not decreased even when a fork/mast inclination is tilted backward to the largest extend, the forklift and the forklift control method according to the present disclosure may decrease a travelling speed of a vehicle by decreasing an output of the forklift or operating a brake, thereby remarkably decreasing the danger of the load falling.

4 Claims, 9 Drawing Sheets

(51) Int. Cl.
*B66F 9/075* (2006.01)
*B66F 17/00* (2006.01)

(56) References Cited

U.S. PATENT DOCUMENTS 6,092,976 A * 7/2000 Kamiya .................... B66F 9/22 187/223
6,256,566 B1 * 7/2001 Kamiya ................ B66F 17/003 172/4.5
6,425,728 B1 * 7/2002 Goto ......................... B66F 9/22 414/636
6,611,746 B1 * 8/2003 Nagai ................... B66F 9/0755 187/222
2004/0249538 A1 * 12/2004 Osaki ........................ B66F 9/24 701/50
2005/0102081 A1 * 5/2005 Patterson .............. B66F 17/003 701/50
2010/0204891 A1 * 8/2010 Biggerstaff ........... E02F 3/3414 701/50
2011/0206489 A1 * 8/2011 Ford .................. B66F 9/07513 414/639
2015/0176253 A1 * 6/2015 Taylor ................... E02F 3/3414 701/50
2016/0376135 A1 * 12/2016 Kim .......................... B66F 9/20 701/50
2017/0043988 A1 * 2/2017 Lee ........................... B66F 9/24

FOREIGN PATENT DOCUMENTS

KR 10-2009-0069529 A 7/2009
KR 10-2010-0048215 A 5/2010
KR 10-2012-0069816 A 6/2012
KR 10-2013-0086746 A 8/2013

OTHER PUBLICATIONS

Written Opinion mailed in corresponding International Patent Application No. PCT/KR2014/009700 dated Jan. 20, 2015, consisting of 4 pp.

* cited by examiner

<table>
<tr><th>EXAMPLE OF DANGER LEVEL</th><th>EXAMPLE1 OF DANGER LEVEL</th><th>EXAMPLE2 OF DANGER LEVEL</th><th>FIRST RESPONSE</th><th>SECOND RESPONSE</th><th>THIRD RESPONSE</th><th>FOURTH RESPONSE</th><th>FIFTH RESPONSE</th></tr>
<tr><td>100%</td><td>90%</td><td>80%</td><td></td><td></td><td></td><td rowspan="4">LIMIT ENGINE OUTPUT</td><td rowspan="3">OPERATE BRAKING</td></tr>
<tr><td>95%</td><td>85%</td><td>75%</td><td></td><td></td><td></td></tr>
<tr><td>90%</td><td>80%</td><td>70%</td><td></td><td></td><td></td></tr>
<tr><td>85%</td><td>75%</td><td>65%</td><td></td><td></td><td rowspan="3">OPERATE MAST TO BE TILTED</td><td></td></tr>
<tr><td>80%</td><td>70%</td><td>60%</td><td></td><td></td><td></td><td></td></tr>
<tr><td>75%</td><td>65%</td><td>55%</td><td></td><td rowspan="3">OUTPUT WARNING (DISPLAY ON DASHBOARD) (WARNING SOUND)</td><td></td><td></td></tr>
<tr><td>70%</td><td>60%</td><td>50%</td><td></td><td></td><td></td><td></td></tr>
<tr><td>65%</td><td>55%</td><td>45%</td><td rowspan="3">OUTPUT PRELIMINARY WARNING (DISPLAY ON DASHBOARD)</td><td></td><td></td><td></td></tr>
<tr><td>60%</td><td>50%</td><td>40%</td><td></td><td></td><td></td><td></td></tr>
<tr><td>55%</td><td>45%</td><td>35%</td><td></td><td></td><td></td><td></td></tr>
<tr><td>50%</td><td>40%</td><td>30%</td><td></td><td></td><td></td><td></td><td></td></tr>
<tr><td>45%</td><td>35%</td><td>25%</td><td></td><td></td><td></td><td></td><td></td></tr>
<tr><td>40%</td><td>30%</td><td>20%</td><td></td><td></td><td></td><td></td><td></td></tr>
</table>

Fig. 5

(a)
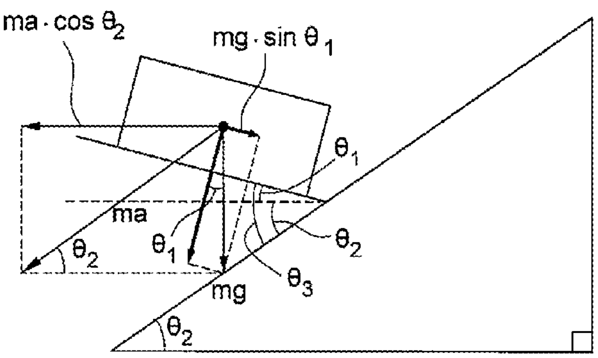
(b)
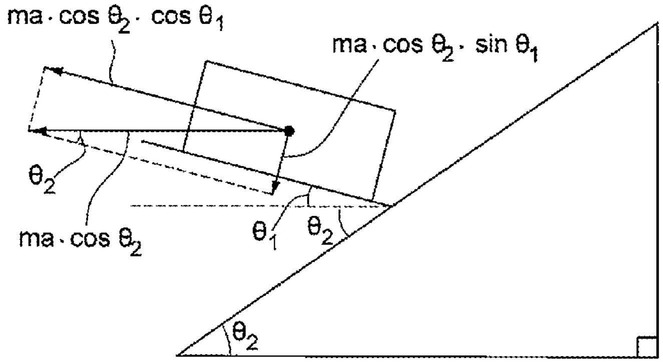
Fig. 9

FORKLIFT AND FORKLIFT CONTROL METHOD

TECHNICAL FIELD

The present disclosure relates to a forklift and a forklift control method, and more particularly, to a forklift and a forklift control method, which prevent a load from falling during the travelling.

BACKGROUND ART

In general, a forklift is used for transporting a load. More particularly, the forklift transports a load while moving along a travelling path.

In the meantime, the forklift receives power from a power source and operates a hydraulic system, and the hydraulic system generates hydraulic pressure. The forklift is operated by hydraulic pressure or an engine and a motor, or raises up a fork with hydraulic pressure. Further, the fork may be provided in a mast, and the mast may be inclined forward and backward in the forklift. The aforementioned power source may be an internal combustion engine or an electric motor.

On the other hand, a load is mounted on a palette, and the fork of the forklift is fitted into the palette. When the fork is raised by an operation of the forklift, the load is raised, and when the forklift travels, the load is transported.

A travelling path, along which the forklift is to travel, may be a flat road or a slope. The slope may be understood as an uphill road or a downhill road according to a travelling direction of the forklift.

When the forklift travels, the forklift travels in a state where the mast is tilted backward so as to prevent the load from falling. The meaning of the backward tilt is that the mast is tilted toward a main body of the forklift. Similarly, the meaning of the forward tilt is that the mast is tilted in a front direction.

In the related art, an operator controls a degree of forward tilt or a degree of backward tilt of the mast by recognizing a travelling path. Accordingly, the operator needs to appropriately control an inclination angle of the mast at an appropriate time at which the forklift enters or exits from a slope.

On the other hand, a load is disposed at a front side of the forklift, so that when the forklift travels in the front direction, the travelling path may be invisible by the load. Accordingly, there is a problem in that it is difficult to obtain information on the travelling path, that is, it is difficult to secure a view.

Accordingly, in the related art, it is difficult to adjust an inclination angle of the mast of the forklift at an appropriate time, and further, an operator may not know a degree of adjustment of the inclination angle of the mast. Particularly, the appropriate control of the inclination angle of the mast is considerably varied according to a skill level of an operator, and there may be a case where an unskillful operator incorrectly sets an inclination angle of the mast. Further, there may be a case where an operator completely irrelevantly controls an inclination of the mast in an incorrect direction due to a wrong determination, and in this case, there is a concern in that a load falls.

LITERATURE OF RELATED ART

Patent Literature

Korean Patent Application Laid-Open No. 10-2012-0069816 (Jun. 29, 2012)

DISCLOSURE

Technical Problem

Accordingly, a technical object to be achieved in the present disclosure is to provide a forklift and a forklift control method, which adjust an inclination angle of a mast in real time so as to prevent a load from falling when the forklift enters or exits from an inclined travelling path in a state of being mounted with the load.

A technical object to be achieved in the present disclosure is not limited to the aforementioned technical objects, and another not-mentioned technical object will be obviously understood from the description below by those with ordinary skill in the art to which the present disclosure pertains.

Technical Solution

In order to achieve the technical object, an exemplary embodiment of the present disclosure provides a forklift, including: a forklift 10 which is mounted with a hydraulic system and is driven by hydraulic pressure output from the hydraulic system; a fork 30, to which a load or a palette is mounted; a mast 20 which is disposed at a front side of the forklift 10 and elevates the fork 30; a tilting actuator 22 which is disposed between the fork 10 and the mast 20, and is operated by the hydraulic pressure output from the hydraulic system to operate the mast 20; an input unit 100, into which weight of the load, an inclination of the forklift 10, an inclination of the mast 20 with respect to the forklift 10, an acceleration of the forklift 10, geological information about a travelling path, and the coefficient of static friction between the fork 30 and the palette 40 are input; and a control unit 200 which calculates static friction force of the load and net force applied to the load based on each information input into the input unit 100 to draw a degree of falling danger of the load, in which the tilting actuator 22 is precedently operated according to the degree of falling danger of the load calculated by the control unit 200 right before the forklift 10 enters and exits from the slope in the travelling path, so that an inclination angle of the mast 20 is controlled.

The forklift may further include a brake or a brake control unit which is installed in a travelling system of the forklift 10 to brake the forklift 10, in which the brake or the brake control unit may be operated according to the degree of falling danger of the load calculated by the control unit 200, so that a speed of the forklift 10 may be controlled.

The forklift may further include a power train or a power train control unit which is installed in a power train system of the forklift 10 to transfer power to the travelling system, in which the power train or the power train control unit may be operated according to the degree of falling danger of the load calculated by the control unit 200, so that an output size of the power may be controlled.

The forklift may further include a brake or a brake control unit which is installed in a travelling system of the forklift 10 to brake the forklift 10; and a power train or a power train control unit which is installed in a power train system of the forklift 10 to transfer power to the travelling system, in which the brake or the brake control unit may be operated and the power train or the power train control unit may be operated according to the degree of falling danger of the load calculated by the control unit 200, so that a speed of the forklift 10 and an output size of the power may be controlled.

In order to achieve the technical object, another exemplary embodiment of the present disclosure provides a method of controlling a forklift, including: first step s10, in which basic data weight of a load, an inclination of the forklift, a fork/mast inclination, an acceleration of the forklift, geological information, and the coefficient of static friction is collected; a third step s30, in which static friction force by the load is calculated; a fourth step s40, in which sizes of the static friction force and net force applied to the load are compared and determined; a fifth step s50, in which when a ratio of the net force to the static friction force reaches 55%, a tilting actuator 22 is controlled so that the static friction force is increased; a sixth step s60, in which updated data (the fork/mast inclination, the inclination of the forklift, and the acceleration of the forklift) is collected; and a seventh step s70, in which sizes of the updated static friction force updated by the update data and the net force applied to the load are compared and determined, and when the updated static friction force is smaller than the net force, the method returns to the fifth step s50, in which an inclination of the fork/mast is precedently controlled right before the forklift enters and exits from a slope in a travelling path.

In the fifth step s50, when the ratio of the net force to the static friction force reaches 35% to 55%, a preliminary warning may be output on a dashboard.

In the fifth step s50, when the ratio of the net force to the static friction force reaches 45% to 65%, a visually or audibly recognizable warning message may be output.

In the fifth step s50, when the ratio of the net force to the static friction force reaches 65% to 85%, a power train or a power train control unit may be controlled, so that an engine output may be decreased.

In the fifth step s50, when the ratio of the net force to the static friction force reaches 70% to 90%, a brake or a brake control unit may be controlled, so that a travelling speed of the forklift may be decreased.

In the seventh step s50, when the updated static friction force is larger than the net force, the method may return to the first step s10.

The method may further include a second step s20, in which it is determined whether there is a load, and when there is the load, the method proceeds to the third step s30, and when there is no load, the method returns to the first step s10, between the first step s10 and the third step s30.

The basic data may further include a definition of a danger level according to a degree of danger, and when the degree of danger is high in the danger level, a ratio of the net force to the static friction force may be set to be low, so that an operation time of the tilting actuator 22 may be controlled to be advanced, and when the degree of danger is low in the danger level, a ratio of the net force to the static friction force may be set to be high, so that an operation time of the tilting actuator 22 may be controlled to be deferred.

Other detailed matters of the exemplary embodiments are included in the detailed description and the drawings.

Advantageous Effects

The forklift and the forklift control method according to the exemplary embodiments of the present disclosure may precedently adjust a fork/mast inclination right before the forklift enters or exits from the slope in a state where a load is mounted on a fork, thereby preventing the load from falling.

Further, the forklift and the forklift control method according to the exemplary embodiments of the present disclosure automatically adjust a fork/mast inclination to an appropriate value, so that even an unskillful operator may safely operate the forklift.

Further, the forklift and the forklift control method according to the exemplary embodiments of the present disclosure may compulsorily decrease a travelling speed of the forklift when a degree of danger is not decreased even though a fork/mast inclination is tilted backward to the largest extent, thereby preventing a load from falling and safely transporting the load.

DESCRIPTION OF DRAWINGS

FIG. 5 is a diagram for describing an example corresponding to each operation in consideration of falling danger of a load in the forklift control method according to the exemplary embodiment of the present disclosure.

FIGS. 6 to 9 are diagrams for describing an example, in which an optimal inclination angle of the mast is drawn in the forklift control method according to the exemplary embodiment of the present disclosure.

DESCRIPTION OF MAIN REFERENCE NUMERALS OF DRAWINGS

Figure 1:
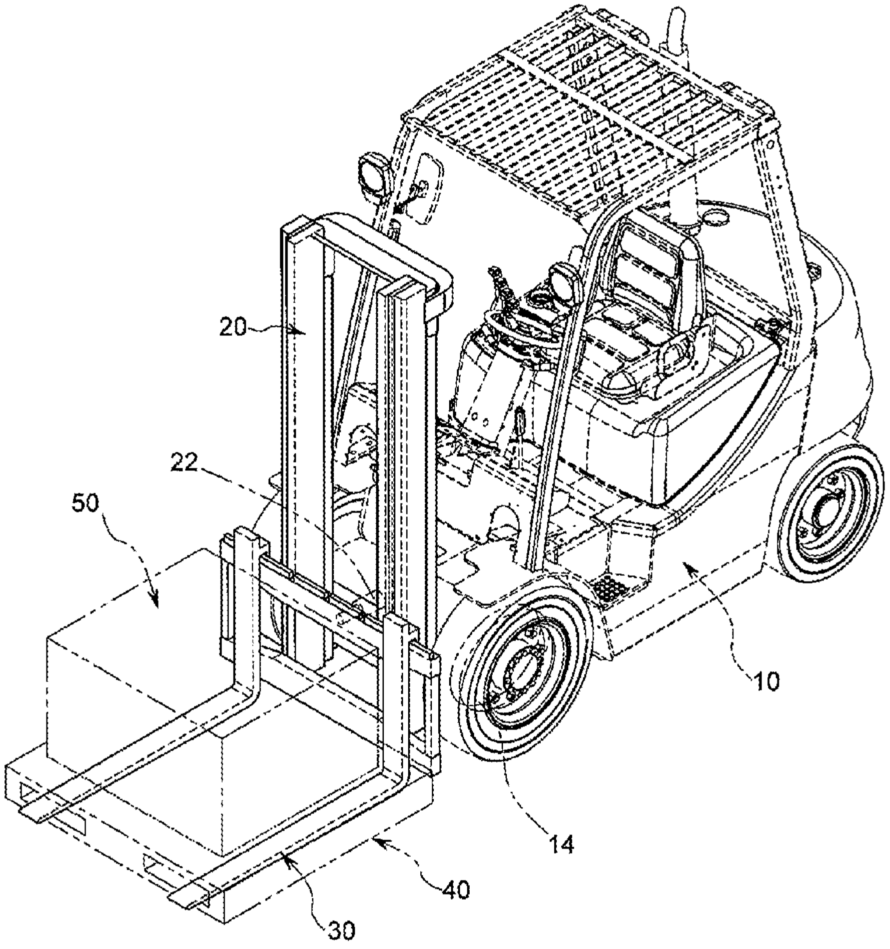
FIG. 1 is a diagram for describing a general configuration of a forklift.

10: Forklift
20: Mast
22: Tilting actuator
30: Fork
40: Palette
50: Load

BEST MODE

Advantages and characteristics of the present disclosure and a method of achieving the advantages and characteristics will be clear by referring to an exemplary embodiment to be described in detail together with the accompanying drawings.

Hereinafter, an exemplary embodiment of the present disclosure will be described in detail with reference to the accompanying drawings. It should be appreciated that the exemplary embodiment, which will be described below, is illustratively described for helping to understand the present disclosure, and the present disclosure may be variously modified to be carried out differently from the exemplary embodiment described herein. In the following description of the present disclosure, a detailed description and a detailed illustration of publicly known functions or constituent elements incorporated herein will be omitted when it is determined that the detailed description may unnecessarily make the subject matter of the present disclosure unclear. Further, the accompanying drawings are not illustrated according to an actual scale, but sizes of some constituent elements may be exaggerated to help understand the present disclosure.

Further, the terms used in the description are defined considering the functions of the present disclosure and may vary depending on the intention or usual practice of a manufacturer. Therefore, the definitions should be made based on the entire contents of the present specification.

Like reference numerals indicate like elements throughout the specification.

First, a general configuration of a forklift will be described with reference to FIG. 1. FIG. 1 is a diagram for describing a general configuration of a forklift.

A forklift 10 is mounted with a hydraulic system. The hydraulic system receives power from a power source. The power source may be an engine or an electric motor.

Further, a mast 20 is installed at a front side of the forklift 10, and a fork 30 is provided in the mast 20.

A load 50 or a palette 40 may be mounted in the fork 30. Universally, the fork 30 enters and exits from the palette 40. That is, when the load 50 is mounted on the palette 40, weight of the load 50 is applied to the fork 30.

In the meantime, the fork 30 is elevated by an operation of the mast 20. The mast 20 may be provided with a step according to a specification of the forklift 10, and when a height of the step is high, the mast 20 may raise up the load 50 to a higher position.

A tilting actuator 22 is disposed between the forklift 10 and the mast 20. The tilting actuator 22 may be operated by hydraulic pressure, and the hydraulic pressure is provided from the hydraulic system. That is, the tilting actuator 22 adjusts an inclination of the mast 20 by tilting forward or backward the mast 20 according to the control of a mast solenoid valve provided in the hydraulic system.

The mast solenoid valve controls a flow rate and a flow direction, and the mast 20 may accurately control a speed, at which the mast 20 is tilted, and a degree of inclination angle of the mast 20 by controlling the mast solenoid valve.

Further, a power train or a power train control unit is provided in the forklift 10 according to the exemplary embodiment of the present disclosure. The power train or the power train control unit transfers power output from the engine or a driving motor to a travelling system or the hydraulic system. That is, when the power train or the power train control unit is controlled by a control command output from a control unit 200, a size of power may be controlled, and for example, when a size of power is controlled to be decreased, the size of power is decreased, so that a travelling speed may be decreased.

Further, a brake or a brake control unit 14 is provided in the forklift 10 according to the exemplary embodiment of the present disclosure. The brake or the brake control unit 14 applies braking to the travelling of the forklift 10.

The electronic brake or brake control unit may be applied, so that it is possible to more precisely control desired braking force. That is, when the brake or the brake control unit 14 is operated by a control command output from the control unit 200, a travelling speed of the forklift 10 may be decreased regardless of an intention of a driver.

In the meantime, the forklift 10 according to the exemplary embodiment of the present disclosure may sequentially control or simultaneously control the power train or the power train control unit and the brake or the brake control unit. Accordingly, it is possible to more stably and smoothly decrease a travelling speed of the forklift 10.

That is, when a travelling speed of the forklift 10 is decreased by any type, falling danger of the load 50 is decreased by the amount of the decrease in the travelling speed.

Further, the forklift 10 according to the exemplary embodiment of the present disclosure includes an input unit 100, in which basic data is collected. Further, the forklift 10 according to the exemplary embodiment of the present disclosure includes the control unit 200 which draws a degree of falling danger of the load based on the basic data. Further, the forklift 10 according to the exemplary embodiment of the present disclosure includes an output unit 300 which controls the forklift 10 according to a degree of falling danger of the load.

The basic data includes weight of a load, an inclination of the forklift 10, an inclination of the mast 20 with respect to the forklift 10, an acceleration of the forklift 10, geological information about a travelling path, and the coefficient of static friction between the fork 30 and the palette 40.

In the meantime, an inclination of the mast and an inclination of the fork may be treated as the same data. The reason is that when the mast 20 is tilted, the fork 30 is tilted together. Further, an angle of the fork 30 with respect to the mast 20 is uniform. Accordingly, when an operator knows an inclination of the mast, the operator may naturally easily know an inclination of the fork. Hereinafter, an inclination of the mast and an inclination of the fork are expressed as a fork/mast inclination.

Weight of a load may be obtained by mounting a weight sensor to the fork, or may also be estimated by pressure applied to a lift cylinder of the mast 20. That is, information on weight of a load is obtained by using a well-known technology, and a detailed description thereof will be omitted.

An inclination of the forklift 10 and an acceleration of the forklift 10 may be obtained by using an acceleration sensor. The acceleration sensor may use a commercial product, so that a more detailed description thereof will be omitted. Further, an acceleration of the forklift 10 may be obtained based on a difference between a current vehicle speed and a previous vehicle speed through a transmission.

An inclination of the mast 20 with respect to the forklift 10 may be obtained by a mast inclination sensor. The mast inclination sensor may measure an inclination of the mast 20 in the main body of the forklift 10, and uses a well-known technology, so that a more detailed description thereof will be omitted.

Geological information about a travelling path may be stored by collecting geological information about a surrounding region, in which the forklift 10 is to travel, in advance, and geological information may also be received in real time. When the geological information is received in real time, the forklift 10 may receive the geological information from a server including the geological information through a wireless network. That is, it is possible to confirm geological information about a travelling path, in which the forklift is to travel, based on location information and geological information indicating a location, at which the forklift is located, received from a global positioning system (GPS).

Accordingly, it is possible to recognize a direction, in which the forklift travels, and recognize whether there is a slope in a direction, in which the forklift desires to travel.

The coefficient of static friction between the fork 30 and the palette 40 may be obtained by referring to information about a map of the coefficient of friction. The map of the coefficient of friction will be described with reference to FIG. 4.

In the forklift 10, various forms of mast 20 may be mounted, and various forms of palettes 40 may be used. The fork 30 is provided in the mast 20, so that it may be understood that the fork 30 is variously provided. That is, when a specification of the mast 20 is changed, a specification of the fork 30 is always changed as a matter of course, so that the mast 20 and the fork 30 will be equally treated and described.

Figure 4:
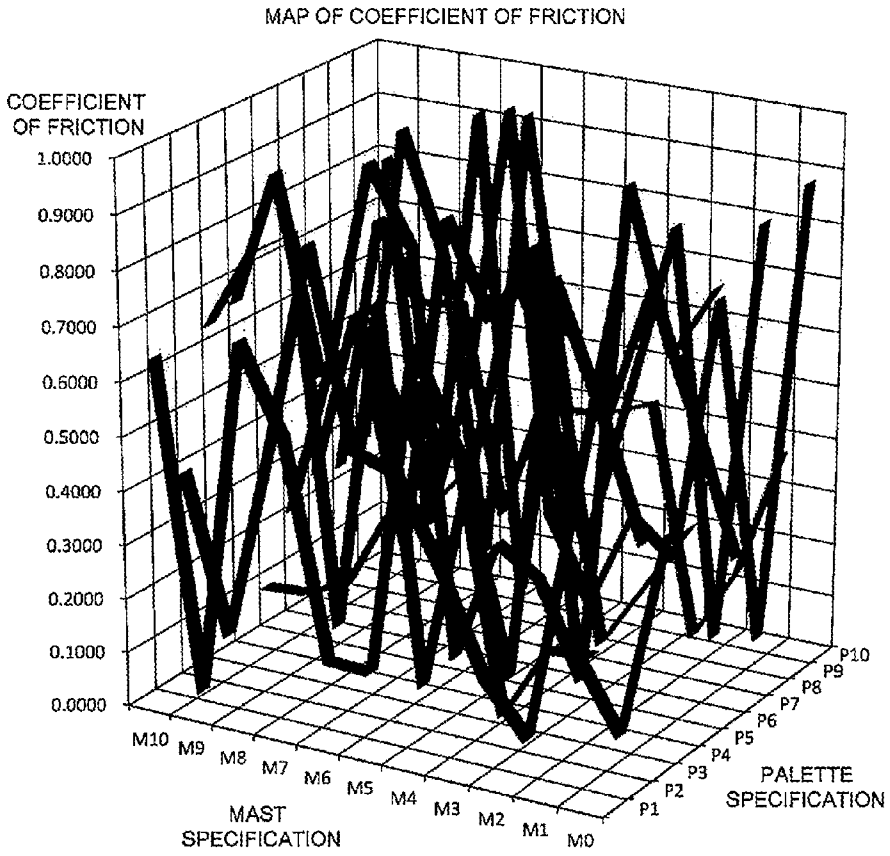
FIG. 4 is a diagram for describing the coefficient of friction according to specifications of a palette and a mast in the forklift control method according to the exemplary embodiment of the present disclosure.
Figure 6:
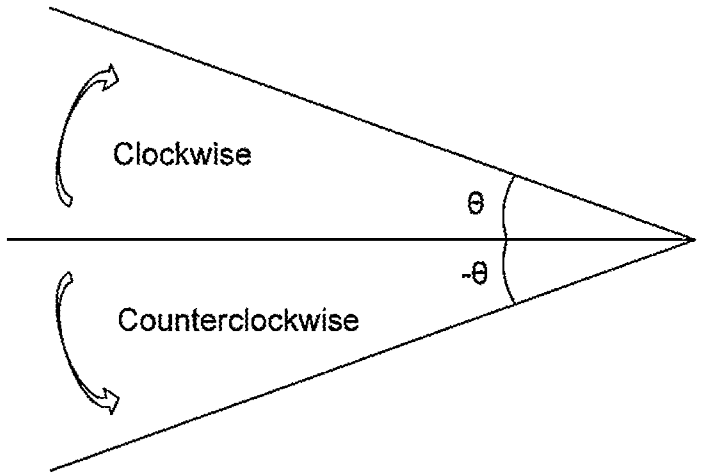

According to FIG. 4, various examples M1 to M10 of the mast 10 and various examples P1 to P10 of the palette are suggested. The coefficient of friction is varied according to the kind of combination of the mast 10 and the palette 40.

Accordingly, when the operator is aware of the kind of mast 10 mounted and the kind of palette 40 used, it is possible to know the coefficient of friction. In the meantime, a manufacturing company of the forklift 10 may mount the most universally used coefficient of friction in advance, and information on the coefficient of friction may also be updated by an operator or an A/S staff.

The control unit 200 may calculate static friction force of the load and a net force applied to the load based on information on the basic data input into the input unit 100, and draw a degree of falling danger of the load according to a ratio of the net force to the static friction force.

Accordingly, in the forklift 10 according to the exemplary embodiment of the present disclosure, the tilting actuator 22 is operated according to the degree of falling danger of the load, which is calculated by the control unit 200, during the travelling of the forklift 10, so that an inclination angle of the mast 20 is controlled.

Particularly, the forklift 10 according to the exemplary embodiment of the present disclosure reflects the geological information, so that the tilting actuator 22 may be precedently operated right before the forklift 10 enters and exits from a slope in the travelling path, and thus the operator is capable of more stably operating the forklift 10.

Hereinafter, a forklift control method according to an exemplary embodiment of the present disclosure will be described with reference to FIGS. 2 and 3.

Figure 2:
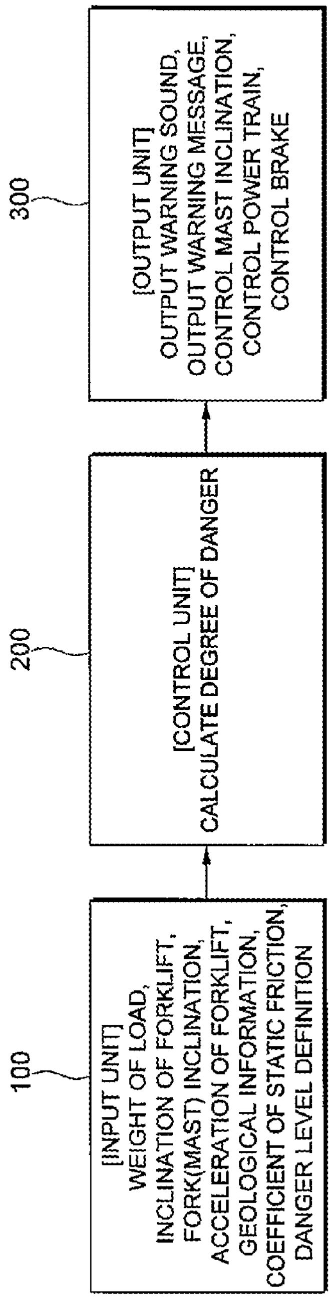
FIG. 2 is a diagram for describing a forklift and a forklift control method according to an exemplary embodiment of the present disclosure.
Figure 3:
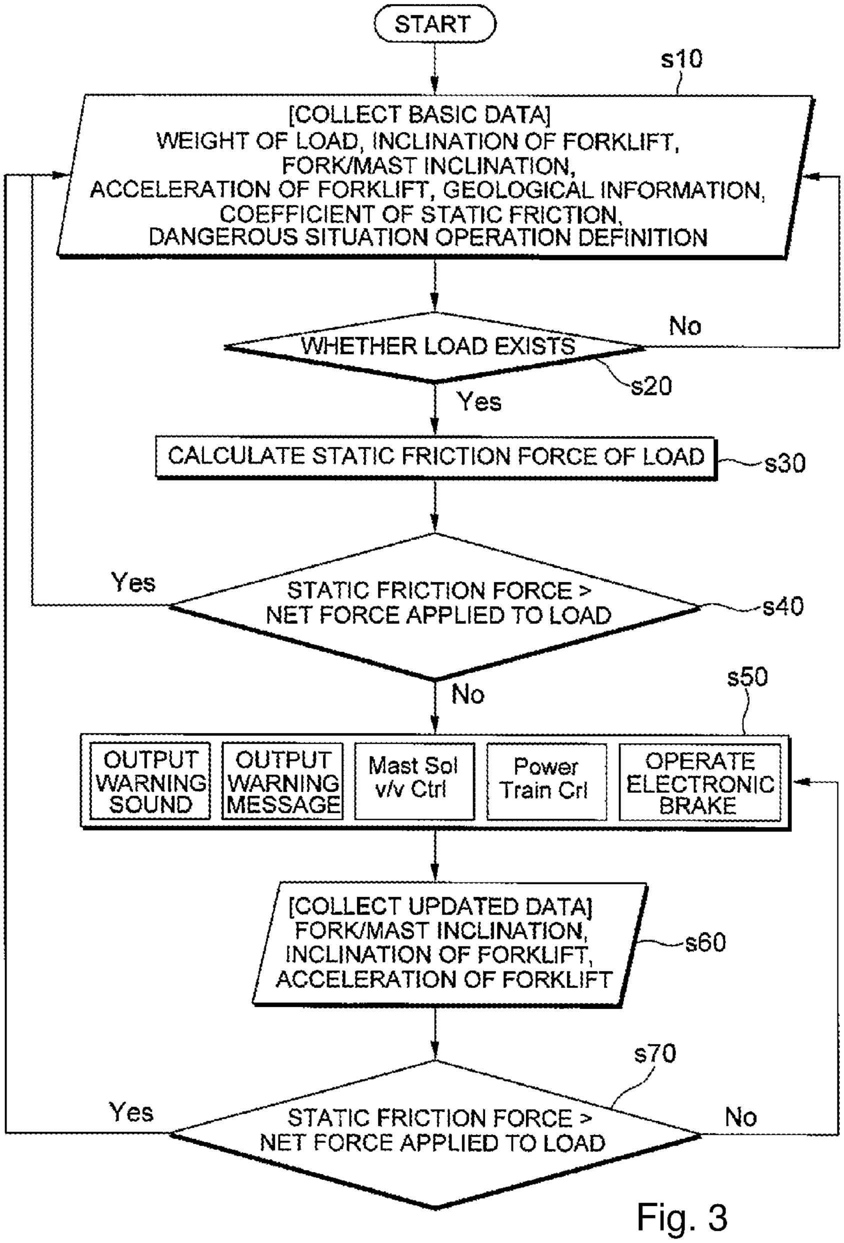
FIG. 3 is a flowchart for describing the forklift control method according to the exemplary embodiment of the present disclosure.

FIG. 2 is a diagram for describing a forklift and a forklift control method according to an exemplary embodiment of the present disclosure. FIG. 3 is a flowchart for describing the forklift control method according to the exemplary embodiment of the present disclosure.

As illustrated in FIG. 2, in the forklift control method according to the exemplary embodiment of the present disclosure, the input unit 100 collects basic data, the control unit 200 calculates a degree of danger and outputs a control command, and the output unit 300 performs the control command.

The data input into the input unit 100 may be weight of a load, an inclination of the forklift, a fork/mast inclination, an acceleration of the forklift, geological information, and the coefficient of static friction as described above.

Further, a definition of a danger level may be further included in the input unit 100.

Accordingly, when a degree of danger is high in the danger level, a ratio of net force to static friction force is set to be low, so that an operation time of the tilting actuator 22 is controlled to be advanced.

Further, when a degree of danger is low in the danger level, a ratio of net force to static friction force is set to be high, so that an operation time of the tilting actuator 22 is controlled to be deferred.

The danger level will be additionally described below.

When an inclination angle of the mast 20 or the fork 30 is adjusted, when the adjusted operation time is early, a time, at which the fork/mast is tilted, comes early, thereby rapidly responding to falling danger of the load. For example, when the load 50 is vulnerable to damage, is expensive, or is a precise machine, the load 50 needs to be very carefully transported. Accordingly, in order to decrease falling danger of the load, an inclination of the fork/mast is adjusted at an earlier time.

On the other hand, when the load 50 is a durable material, a burden on falling of the load may be decreased. In this case, an operation time, at which the adjustment of the inclination of the fork/mast is initiated, may be deferred, and the adjustment of the inclination of the fork/mast may not be performed depending on a case. Further, a travelling deceleration operation initiating time of the forklift 10 may be postponed. That is, even when the braking is performed, energy is consumed, and it is possible to control excessive braking, thereby decreasing energy loss.

The output unit 300 outputs a warning sound, outputs a warning message, controls a mast inclination, controls the power train, and controls the brake for each danger level.

The danger level may be divided based on a degree of the ratio of net force to static friction force.

The division of the danger level will be described with reference to FIG. 5.

FIG. 5 is a diagram for describing an example corresponding to each operation in consideration of falling danger of a load in the forklift control method according to the exemplary embodiment of the present disclosure.

The danger level may be set according to the kind of load 50. For example, an example of the danger level may be provided with a basic value, and the ratio of net force to static friction force may be more conservatively set when importance of the load 50 is increased.

Example 1 of the danger level represents a more conservative example than the example of the danger level, and Example 2 of the danger level represents a more conservative example than Example 1 of the danger level.

Accordingly, the operator sets the danger level in consideration of whether the load 50 is expensive or a durable product having damage concerns.

When it is assumed that a case where the static friction force is the same as the net force for the load is 100%, a response may be sequentially performed according to a degree of the ratio reached.

First response: When the ratio of the net force to the static friction force reaches 35% to 55%, the first response may be performed. The first response is for the purpose of warning an operator, and in the first response, a preliminary warning may be displayed on a dashboard. That is, a message indicating that falling of the load is concerned, so that carefulness is required is displayed.

Second response: When the ratio of the net force to the static friction force reaches 45% to 65%, the second response may be performed. The second response is for the purpose of more intensively warning the operator, and in the second response, an audibly and visually recognized message may be output in a form of displaying a warning message on a dashboard, generating an audibly recognizable alarm, or turning on a warning lamp. Accordingly, the operator receives an opportunity of directly adjusting a fork/mast inclination.

Third response: When the ratio of the net force to the static friction force reaches 55% to 75%, the third response may be performed. The third response is that the control unit 200 gives a command and directly controls a fork/mast inclination regardless of an intention of the operator.

Fourth response: When the ratio of the net force to the static friction force reaches 65% to 85%, the fourth response may be performed. The fourth response is to more actively take measures so as to prevent the load from falling. That is, the control unit 200 controls the power train or the power train control unit by giving a command, thereby limiting an output of the engine and decreasing travelling force of the forklift 10.

Fifth response: When the ratio of the net force to the static friction force reaches 70% to 90%, the fifth response may be performed. The fifth response is to more actively take measures so as to prevent the load from falling. That is, the control unit 200 controls the brake train or the brake control unit by giving a command, thereby performing the braking and further decreasing travelling force of the forklift 10.

Accordingly, the forklift 10 according to the exemplary embodiment of the present disclosure may automatically control an inclination of the fork/mast and decreases a travelling speed of the forklift 10 even though an operator is unskillful, thereby decreasing falling danger of the load 50.

Hereinafter, the coefficient of static friction and net force for setting a fork/mast inclination will be described with reference to FIGS. 6 to 9.

FIGS. 6 to 9 are diagrams for describing an example, in which an optimal inclination angle of the mast is drawn in the forklift control method according to the exemplary embodiment of the present disclosure.

In order to prevent a load from slipping on a slope, when the inclination of the fork/mast is horizontal to a horizontal line or is on a downhill, the maintenance of a posture, in which the mast is tilted backward, is required.

In order to calculate an inclination angle range, in which a cargo does not slip on the slope, force applied to the load needs to be calculated with a vector sum. That is, a size of a vector sum for force, with which the load tries to move forward, needs to be smaller than that of maximum static friction force of the load in the fork. There may be three cases according to an angle between the ground and the fork. When an angle between the ground and the fork is θ1, as represented, there are a first case, in which the fork is horizontal, a second case, in which the fork is tilted, and a third case, in which the fork is lifted.

[First Case]

Figure 7:
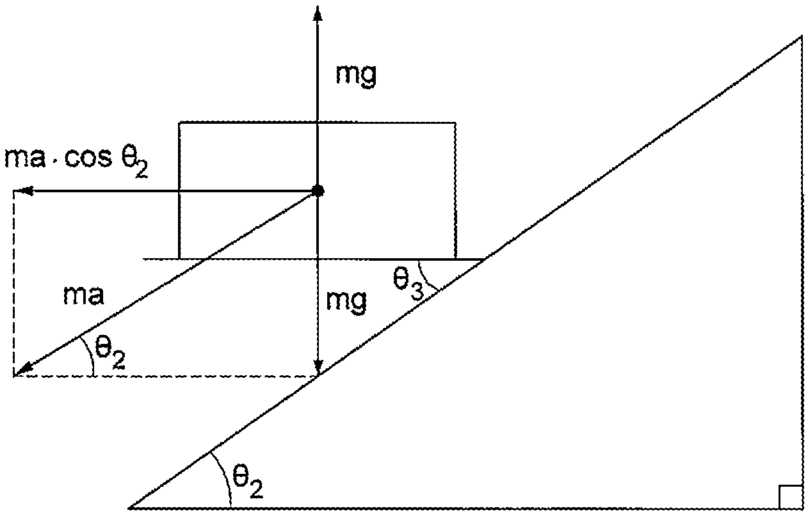

The first case is a case in which the fork is horizontal to the ground as illustrated in FIG. 7. Net force that is the vector sum may be calculated by Equation 1.

$$\theta_1=0$$

$$\theta_2=\theta_1\theta_3$$

$$ma\cdot\cos\theta_2<\mu mg \quad \text{[Equation 1]}$$

$\theta_1$: fork angle
$\theta_2$: slope angle
$\theta_3$: fork angle with respect to slope
ma: force of load
mg: weight of load
μ: coefficient of friction A case where the net force is larger than the static friction force means that the load is movable. In contrast to this, a case where the net force is larger than the static friction force means that the load is stable.

In Equation 1, when the net force is larger than the static friction force, the method moves to the third case, so that the fork/mast inclination is adjusted, and in this case, the mast 20 is adjusted in a direction, in which the mast 20 is tilted backward.

In the meantime, the forklift performs the response for each level according to the degree of danger as suggested in FIG. 5 according to a degree of the ratio of the net force to the static friction force.

[Second Case]

Figure 8:
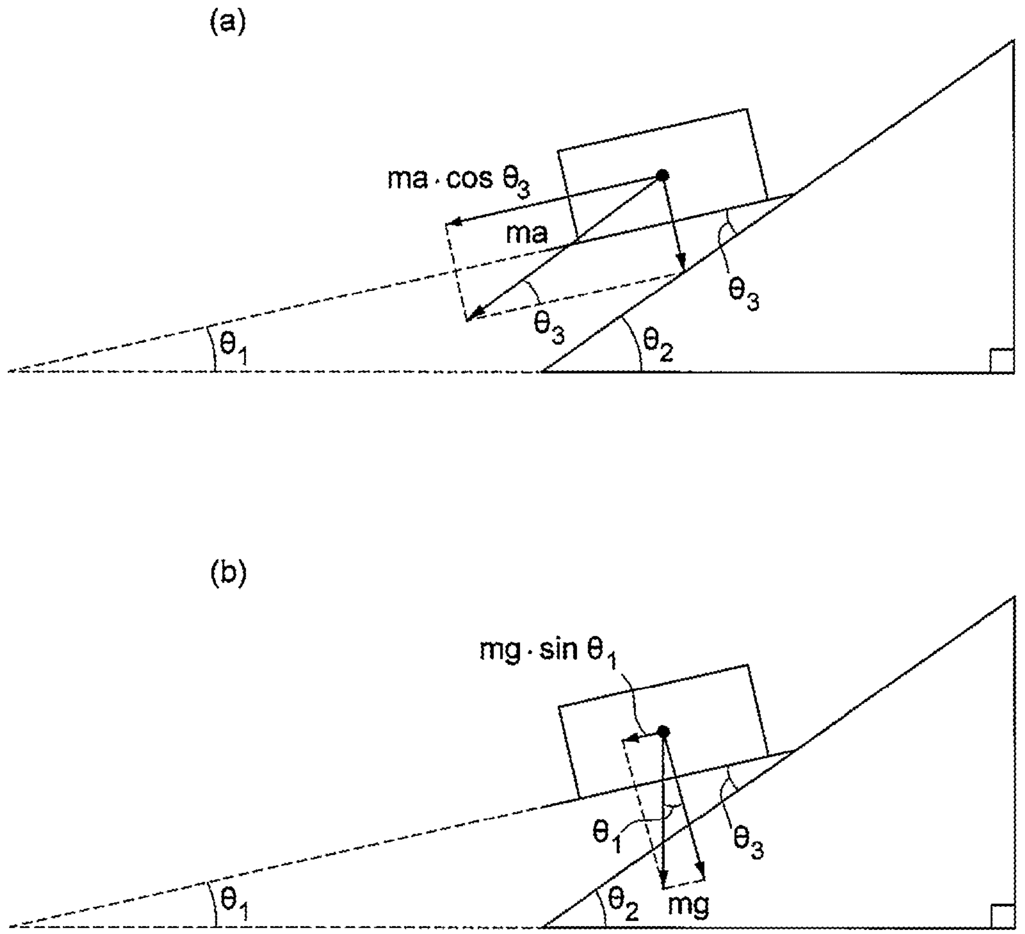

The second case is a case where the fork is tilted with respect to the slope and is tilted forward as illustrated in FIG. 8. Net force that is the vector sum may be calculated by Equation 2.

$$-90°<\theta_1<0°$$

$$\theta_2=\theta_1+\theta_3$$

$$ma\cdot\cos\theta_3+mg\cdot\sin\theta_1<\mu mg\cdot\cos\theta 1 \quad \text{[Equation 2]}$$

$\theta_1$: fork angle
$\theta_2$: slope angle
$\theta_3$: fork angle with respect to slope
ma: force of load
mg: weight of load
μ: coefficient of friction In Equation 2, when the net force is larger than the static friction force, the method moves to the third case, so that the fork/mast inclination is adjusted, and in this case, the mast 20 is adjusted in a direction, in which the mast 20 is tilted backward, so that the angle of the fork is larger than that of the ground (horizontal line).

In the meantime, the forklift performs the response for each level according to the degree of danger as suggested in FIG. 5 according to a degree of the ratio of the net force to the static friction force.

[Third Case]

The third case is a case where the fork is lifted with respect to the slope as illustrated in FIG. 9. Net force that is the vector sum may be calculated by Equation 3.

$$0°<\theta_1<90°$$

$$\theta_3=\theta_1+\theta_2$$

$$ma\cdot\cos\theta_2\cdot\cos\theta_1-mg\cdot\sin\theta_1<\mu mg\cdot\cos\theta_2\cdot\sin\theta_1 \quad \text{[Equation 3]}$$

$\theta_1$: fork angle
$\theta_2$: slope angle
$\theta_3$: fork angle with respect to slope
ma: force of load
mg: weight of load
μ: coefficient of friction In Equation 3, when the net force is larger than the static friction force, the fork/mast inclination is adjusted, and in this case, the adjustment of the fork/mast inclination may be stopped when a condition, in which the load 50 does not slip from the fork 30, is satisfied. The stop of the adjustment of the fork/mast inclination is to stop an operation of the tilting actuator 22 which operates the mast 20. The tilting actuator 22 may be implemented by controlling the mast solenoid valve which controls working fluid to be provided to the tilting actuator 22.

On the other hand, the first, second, and third cases are described based on the example, in which the forklift 10 travels the downhill, but are applicable to a case where the forklift 10 travels an uphill. That is, in a case of the uphill, the excessive backward tilt may cause danger due to falling of the load and the like, but the forklift 10 according to the exemplary embodiment of the present disclosure adjusts the fork/mast inclination in consideration of the coefficient of friction and an acceleration of the forklift, so that when it is determined that the mast is excessively tilted backward and thus it is dangerous, it is possible to adjust the fork/mast inclination forward.

On the other hand, when the forklift 10 desires to decelerate after the second-stage travelling (high-speed travelling), the forklift 10 may be influenced by inertia due to weight of the load. Accordingly, the forklift 10 according to the exemplary embodiment of the present disclosure considers the acceleration, so that it is possible to prevent the forklift 10 from being sharply decelerated and prevent the load 50 from falling.

On the other hand, the forklift 10 according to the exemplary embodiment of the present disclosure adjusts the fork/mast inclination with reference to geological information, so that the fork/mast inclination may be adjusted in real time, but it is possible to know a time, at which the forklift 10 enters or exits from a slope, in advance, so that it is possible to attempt to precedently adjust the fork/mast inclination.

The precedent control of the fork/mast inclination will be described in detail.

According to the characteristic of the hydraulic system, when a command is given, a predetermined time is consumed until the command is put into practice. For example, when the command is given so as to adjust the fork/mast inclination, the mast solenoid valve is opened, working fluid is provided from the hydraulic system to the tilting actuator 22, and as a result, the mast 20 is operated to be tilted by the command. The time taken for the aforementioned process may be about 100 ms to 3 s. Accordingly, in a case where the forklift 10 enters or exits from the slope, when the fork/mast inclination is adjusted at the time of the actual entrance of the forklift 10 to the slope, the adjustment of the fork/mast inclination may be deferred.

By contrast, the forklift 10 according to the exemplary embodiment of the present disclosure refers to the geological information as described above, so that it is possible to precedently adjust the fork/mast inclination right before the forklift 10 enters or exits from the slope. Accordingly, at the time, at which the forklift actually enters the slope, an angle between the fork and the ground (horizontal line) may maintain a backward tilt posture.

On the other hand, when a degree of danger is not decreased even though the fork/mast inclination is tilted backward to the largest extent, it is possible to compulsorily decrease the travelling speed of the forklift 10, thereby preventing the load from falling and safely transporting the load 50.

The exemplary embodiments of the present disclosure have been described with reference to the accompanying drawings, but those skilled in the art will understand that the present disclosure may be implemented in another specific form without changing the technical spirit or essential feature thereof.

Accordingly, it will be understood that the aforementioned exemplary embodiments are described for illustration in all aspects and are not limited, and it should be interpreted that the scope of the present disclosure shall be represented by the claims to be described below, and all of the changes or modified forms induced from the meaning and the scope of the claims, and an equivalent concept thereof are included in the scope of the present disclosure.

INDUSTRIAL APPLICABILITY

The forklift and the forklift control method according to the present disclosure may be used for preventing a load from falling by adjusting an inclination angle of a mast by reflecting geological information about a travelling path during travelling.

The invention claimed is:

1. A forklift, comprising:

a forklift which is mounted with a hydraulic system and is driven by hydraulic pressure output from the hydraulic system;

a fork, on which a load or a palette is mounted;

a mast which is disposed at a front side of the forklift and elevates the fork;

a tilting actuator which is disposed between the fork and the mast, and is operated by the hydraulic pressure output from the hydraulic system to adjust a degree of an inclination of the mast;

an input unit, into which weight of the load, an inclination of the forklift, an inclination of the mast with respect to the forklift, an acceleration of the forklift, geological information about a travelling path, and the coefficient of static friction between the fork and the palette are input; and a control unit which calculates static friction force of the load and net force applied to the load based on each information input into the input unit to draw a degree of falling danger of the load, wherein the tilting actuator is precedently operated according to the degree of falling danger of the cargo calculated by the control unit right before the forklift enters and exits from the slope in the travelling path, so that an inclination angle of the mast is controlled.

2. The forklift of claim 1, further comprising:

a brake or a brake control unit which is installed in a travelling system of the forklift to brake the forklift, wherein the brake or the brake control unit is operated according to the degree of falling danger of the load calculated by the control unit, so that a speed of the forklift is controlled.

3. The forklift of claim 1, further comprising:

a power train or a power train control unit which is installed in a power train system of the forklift to transfer power to the travelling system, wherein the power train or the power train control unit is operated according to the degree of falling danger of the load calculated by the control unit, so that an output size of the power is controlled.

4. The forklift of claim 1, further comprising:

a brake or a brake control unit which is installed in a travelling system of the forklift to brake the forklift; and a power train or a power train control unit which is installed in a power train system of the forklift to transfer power to the travelling system, wherein the brake or the brake control unit is operated and the power train or the power train control unit is operated according to the degree of falling danger of the load calculated by the control unit, so that a speed of the forklift and an output size of the power are controlled.

* * * * *